(12) United States Patent
Cypher et al.

(10) Patent No.: US 7,949,831 B2
(45) Date of Patent: May 24, 2011

(54) MAINTAINING CACHE COHERENCE USING LOAD-MARK METADATA TO DENY INVALIDATION OF LOAD-MARKED CACHE LINES

(75) Inventors: Robert E. Cypher, Saratoga, CA (US); Shailender Chaudhry, San Francisco, CA (US)

(73) Assignee: Oracle America, Inc., Redwood Shores, CA (US)

( * ) Notice: Subject to any disclaimer, the term of this patent is extended or adjusted under 35 U.S.C. 154(b) by 824 days.

(21) Appl. No.: 11/934,595

(22) Filed: Nov. 2, 2007

(65) Prior Publication Data

US 2009/0119461 A1    May 7, 2009

(51) Int. Cl.
*G06F 12/00* (2006.01)
(52) U.S. Cl. .................... 711/141; 711/144; 711/145
(58) Field of Classification Search ............ 711/144, 711/145, 141
See application file for complete search history.

(56) References Cited

U.S. PATENT DOCUMENTS

| | | | |
|---|---|---|---|
| 6,505,253 B1 * | 1/2003 | Chiu et al. ................ | 709/235 |
| 7,523,266 B2 * | 4/2009 | Chaudhry et al. ........... | 711/141 |
| 2002/0065992 A1 * | 5/2002 | Chauvel et al. .............. | 711/141 |
| 2004/0039880 A1 * | 2/2004 | Pentkovski et al. .......... | 711/146 |
| 2004/0187123 A1 * | 9/2004 | Tremblay et al. ............ | 718/100 |

* cited by examiner

*Primary Examiner* — Hong Kim
(74) *Attorney, Agent, or Firm* — Park, Vaughan, Fleming & Dowler LLP; Anthony Jones

(57) ABSTRACT

Embodiments of the present invention provide a system that maintains load-marks on cache lines. The system includes: (1) a cache which accommodates a set of cache lines, wherein each cache line includes metadata for load-marking the cache line, and (2) a local cache controller for the cache. Upon determining that a remote cache controller has made a request for a cache line that would cause the local cache controller to invalidate a copy of the cache line in the cache, the local cache controller determines if there is a load-mark in the metadata for the copy of the cache line. If not, the local cache controller invalidates the copy of the cache line. Otherwise, the local cache controller signals a denial of the invalidation of the cache line and retains the copy of the cache line and the load-mark in the metadata for the copy of the cache line.

24 Claims, 3 Drawing Sheets

MAINTAINING CACHE COHERENCE USING LOAD-MARK METADATA TO DENY INVALIDATION OF LOAD-MARKED CACHE LINES

BACKGROUND

1. Field of the Invention

The present invention relates to the design of computer systems. More specifically, the present invention relates to a technique for maintaining cache coherence using load-mark metadata.

2. Related Art

In multiprocessor systems, processors often share memory structures that are used to store data. For example, each processor in a multiprocessor system may include a separate local L1 cache, while the processors collectively share an L2 cache and a main memory.

In such systems, a data hazard can arise when multiple processors perform interfering accesses to a shared cache line. For example, an interfering access occurs if one thread loads a value from a cache line while another thread (on the same processor or on another processor) stores a value to the cache line.

In order to prevent such interfering accesses, processor designers have developed systems that can place "load-marks" on cache lines which are accessed by threads. When a cache line is load-marked by a thread, the system prevents other threads from storing values to the cache line, thereby permitting the load-marking thread to read from the cache line without interfering accesses from other threads. In addition, because threads that perform loads do not interfere with each other, some systems allow multiple threads to load-mark (and hence load from) a cache line simultaneously.

Some systems that support load-marking include a load-mark count value (a "reader count") in the metadata for each cache line. In these systems, when load-marking a cache line, the system increments the value of the cache line's reader count, and when removing a load-mark from a cache line, the system decrements the value of the cache line's reader count. When another thread requests exclusive access to the cache line (e.g., so the thread can store to the cache line), the system sums the reader counts from all copies of the cache line from various caches in the system. If the sum of these reader counts is greater than zero, the cache line is load-marked and the requesting thread is denied exclusive access. This technique that uses a load-mark counter to load-mark cache lines is described in more detail in U.S. patent application Ser. No. 11/635,270, entitled "Efficient Marking of Shared Cache Lines," by inventors Robert E. Cypher and Shailender Chaudhry.

Other systems include a timestamp that is included in the load-marked cache line's metadata along with the load-mark. In these systems, the system writes the current value of the timestamp into the metadata for a cache line when load-marking the cache line. When another thread requests exclusive access to a cache line, the system determines if there is a load-mark on the cache line and if the cache line has a current timestamp. If so, the requesting thread is denied exclusive access. Eventually, the system updates the value of the timestamp by incrementing the timestamp when a predefined condition occurs. When the timestamp is updated, all load-marks using the previous timestamp are considered "stale" and can be removed from the affected cache lines. Using timestamps for load-marking cache lines is described in more detail in U.S. patent application Ser. No. 11/773,158, entitled "Cache Line Marking with Shared Timestamps," by inventors Robert E. Cypher and Shailender Chaudhry.

In some systems, when a thread requests exclusive access to a cache line, the system invalidates all copies of the cache line in other caches and forwards a copy of the cache line (including any load-marks) to the requesting thread's processor. If the cache line is load-marked, the requesting thread's processor recognizes that the cache line is load-marked and prevents the requesting thread from storing to the cache line. The load-marking thread(s) must then request a copy of the cache line with read permissions (and replace the load-mark on the cache line, if desired) before they can again read from the cache line. Thus, the invalidations of load-marked copies of the cache line can hamper the performance of threads that have placed or will place load-marks on the cache line.

Hence, what is needed is a system that supports load-marked cache lines without the above described problems.

SUMMARY

Embodiments of the present invention provide a system that maintains load-marks on cache lines. The system includes: (1) a cache which accommodates a set of cache lines, wherein each cache line includes metadata for load-marking the cache line, and (2) a local cache controller for the cache. Upon determining that a remote cache controller has made a request for a cache line that would cause the local cache controller to invalidate a copy of the cache line in the cache, the local cache controller determines if there is a load-mark in the metadata for the copy of the cache line. If not, the local cache controller invalidates the copy of the cache line. Otherwise, the local cache controller signals a denial of the invalidation of the cache line and retains the copy of the cache line and the load-mark in the metadata for the copy of the cache line.

In some embodiments, determining that the remote cache controller has made a request for a cache line involves determining that the remote cache controller has asserted a combination of global cache-control lines to request exclusive access to the cache line and denying the invalidation request involves asserting an otherwise unused combination of a set of global cache-control lines to indicate the denial.

In some embodiments, determining that the remote cache controller has made a request for a cache line involves determining that the remote cache controller has asserted a combination of global cache-control lines to request exclusive access to the cache line and denying the invalidation request involves asserting a negative acknowledge (NACK) signal on a set of global cache-control lines to indicate the denial.

In some embodiments, determining that the remote cache controller has made a request for a cache line involves determining that a memory controller has forwarded the request from the remote cache controller to the local cache controller and denying the invalidation request involves signaling a NACK to the memory controller to indicate the denial In some embodiments, when denying the invalidation of the load-marked cache line, the local cache controller asserts an indicator in the metadata for the copy of the cache line to prevent subsequent load-marks from being placed on the copy of the cache line. Then, after a subsequent store to the cache line has completed, the local cache controller deasserts the indicator in the metadata for the copy of the cache line.

In some embodiments, when determining if there is a load-mark in the metadata for the copy of the cache line, the local cache controller determines if a reader count is greater than zero in the metadata for the copy of the cache line.

In some embodiments, when determining if there is a load-mark in the metadata, the local cache controller determines if there exists a load-mark and a current timestamp in the metadata for the copy of the cache line.

In some embodiments, upon determining that the remote cache controller has made a non-NACKable request, the local cache controller invalidates the copy of the cache line.

In some embodiments, invalidating the copy of the cache line involves acknowledging the invalidation of the copy of the cache line.

Embodiments of the present invention provide a system that maintains load-marks on a set of cache lines in a cache. The system starts by determining that a remote cache controller has made a request for a cache line that would cause a copy of the cache line in the cache to be invalidated. The system then determines if the copy of the cache line in the cache is load-marked. If not, the system invalidates the copy of the cache line. Otherwise, the system signals a denial of the invalidation of the copy of the cache line and retains the copy of the cache line and the load-mark in the metadata for the copy of the cache line.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

Embodiments of the present invention provide a system that maintains load-mark metadata for cache lines. In these embodiments, a cache controller uses a modified cache-coherency protocol to provide a negative response to requests to invalidate the cache line to avoid invalidating a load-marked cache line.

Generally, embodiments of the present invention apply to any cache-coherency protocol that can be modified to facilitate providing a negative response to an invalidation request. Hence, in some embodiments of the present invention, the cache-coherency protocol is a directory-based protocol. In other embodiments of the present invention, the cache-coherency protocol is a snooping protocol.

In embodiments of the present invention that use a directory-based protocol, a processor may request exclusive access to a cache line (i.e., write permission for the cache line) by sending a request to a memory controller that includes a directory of cache lines held in a set of corresponding cache(s) along with the controller's record of the cache lines' protocol state. The memory controller then forwards the request to the cache controllers for any cache that holds the cache line in an affected protocol state.

In embodiments of the present invention that use a snooping protocol, a processor may request exclusive access to a cache line by requesting the cache line from a memory controller on one or more global signal lines that are monitored by other cache controllers in the system.

Upon determining that a processor has made a request for exclusive access to a cache line, a cache controller for a local cache (e.g., an L1 cache) determines if a copy of the cache line in the local cache is load-marked. If so, the cache controller can deny the request, thereby avoiding the invalidation of the cache line (and avoiding the delay associated with subsequently re-requesting a readable copy of the cache line and load-marking the cache line). The requesting processor can then resend the request for exclusive access to the cache line at a later time.

Computer System

Figure 1:
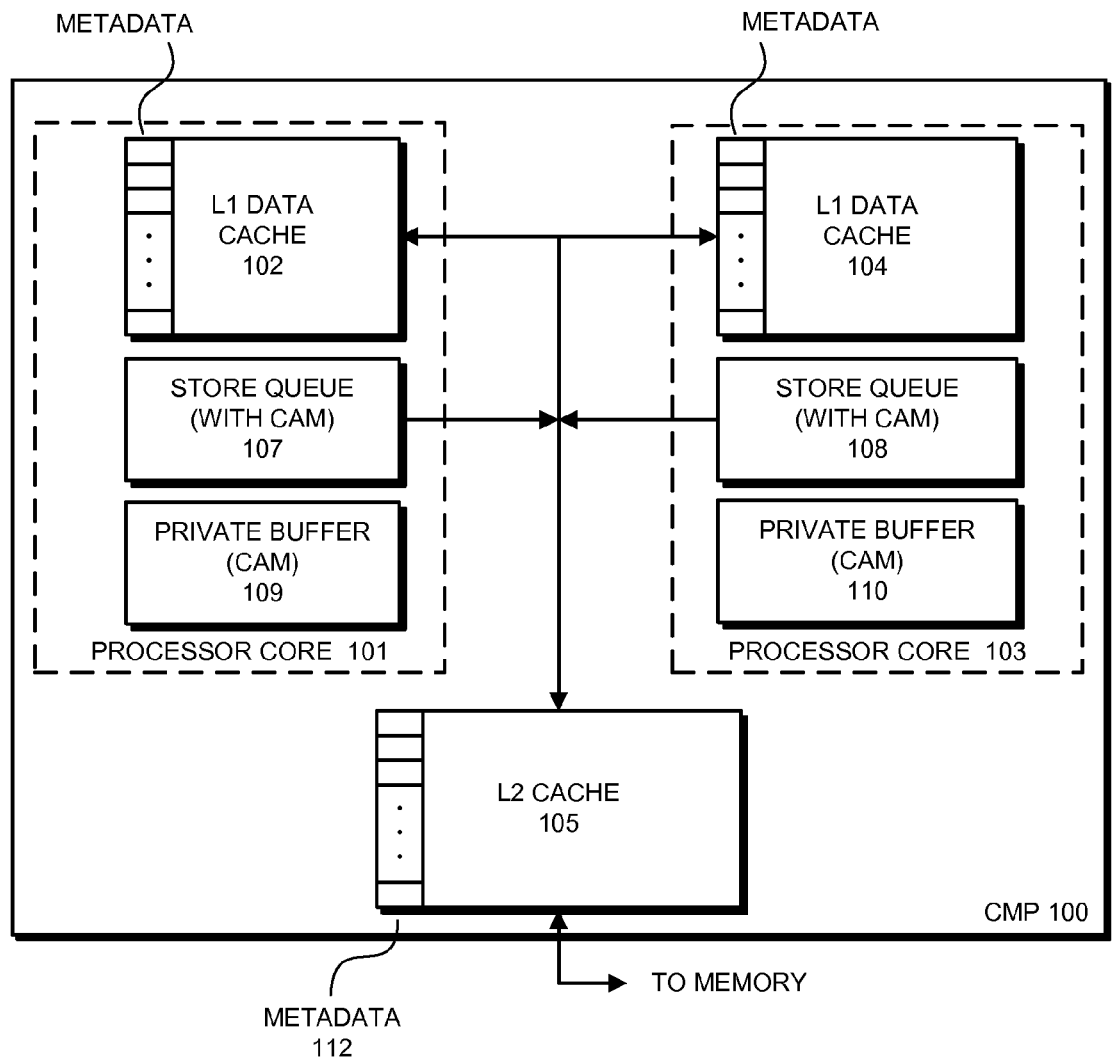
FIG. 1 illustrates an exemplary Chip Multi-Processor (CMP) in accordance with embodiments of the present invention.

FIG. 1 illustrates an exemplary Chip Multi-Processor (CMP) 100 in accordance with embodiments of the present invention. CMP 100 is incorporated onto a single semiconductor die, and includes two processor cores, 101 and 103. (Note that in some embodiments of the present invention, CMP 100 includes more than two processor cores.) Each processor core 101 and 103 is a separate processing unit that performs computational operations. Moreover, each processor core 101 and 103 uses one or more execution threads (or strands) to perform computational operations.

In some embodiments of the present invention, CMP 100 is part of a computer system. Within the computer system, CMP 100 can be coupled to devices such as video cards, network cards, optical drives, and other peripheral devices using a bus, a network, or another suitable communication channel.

Processor cores 101 and 103 include L1 data caches 102 and 104, respectively, and they share L2 cache 105. Data caches 102 and 104 store data for processor cores 101 and 103. In addition to L1 data caches 102 and 104, processor cores 101 and 103 include store queues 107 and 108, which buffer pending store operations.

During a store operation, processor core 101 first performs a lookup for a corresponding cache line in L1 data cache 102. If the lookup generates a hit in the L1 data cache 102, processor core 101 allocates an entry for the store in store queue 107. However, if the lookup generates a miss in L1 data cache 102, processor core 101 allocates an entry for the store in store queue 107 and sends a corresponding fetch for the store to L2 cache 105 (i.e., a request for write permission for the cache line). If the fetch for the store misses in the L2 cache (i.e., the cache line is not present in the L2 cache), the memory system can fetch the cache line from memory.

During a subsequent load operation, processor core 101 uses store queue 107 to locate completed but not-yet-retired stores to the same address that are logically earlier in program order. For each byte being read by the load operation, if such a corresponding store exists, the load operation obtains its value from store queue 107 rather than from the memory subsystem.

Note that cache lines contained in L1 data caches 102 and 104, L2 cache 105 include "load-marks" and "store-marks" in metadata associated with the cache line. A thread (i.e., a processor) can place a load-mark or a store-mark on a cache line by asserting the load-mark or store-mark in the metadata for the cache line. When a cache line is load-marked by a thread, no other threads are allowed to store to the cache line, thereby preventing another thread from overwriting a value in the cache line. On the other hand, when a cache line is storemarked by a thread, no other threads are allowed to load from or store to the cache line, thereby providing the store-marking thread with exclusive access to the cache line. (Note that a store-mark blocks all accesses to the cache line, while a load-mark only blocks stores to the cache line, hence the store-mark can be considered the "stronger" of the two forms of cache-line marking.) We refer to the process of placing such marks on a cache line as either "load-marking" or "store-marking" the cache line.

When a thread has placed a load-mark on a cache line, the thread can perform any number of loads from the cache line. In other words, as long as a load-mark is set on the cache line, the marking thread may freely load the value from the cache line.

A load-mark prevents any other thread from writing to the cache line but not from reading from the cache line, so multiple threads can place load-marks on a cache line (i.e., multiple threads can be reading from the cache line simultaneously). When multiple threads have load-marked the cache line, other threads are prevented from writing to the cache line until all of the threads have removed their load-marks.

Reader Counts for Supporting Multiple Load-Marks

In some embodiments of the present invention, each cache line's metadata includes a "reader count" value that is used to track the number of threads that have placed load-marks on the cache line. In these embodiments, when a cache line is load-marked, the reader count value for that cache line is incremented. When the load-mark is subsequently removed, the reader count value is decremented.

In these embodiments, in order to determine if a thread can acquire exclusive (writable) access to the cache line, the system collects the reader counts associated with each copy of the cache line in local caches and sums the collected reader counts. If the summed reader count is greater than zero, one or more load-marks remain on the cache line and the system denies the request for exclusive access. The process of using reader count values to load-mark cache lines is described in more detail in U.S. patent application Ser. No. 11/635,270, entitled "Efficient Marking of Shared Cache Lines," filed 6 Dec. 2006 by inventors Robert E. Cypher and Shailender Chaudhry, which issued 16 Jun. 2009 as U.S. Pat. No. 7,549,025. This patent is hereby incorporated by reference.

In some embodiments of the present invention, only reader count values which are zero or greater are used. This is because the decision to deny an invalidation must be made locally by a CC 204 (i.e., without the reader count values from other copies of the cache line in other caches). If negative load-mark counts are used, such a decision cannot be made locally, because the reader count values from the other caches must be collected and summed before making the decision.

Timestamps for Supporting Multiple Load-Marks

In some embodiments of the present invention, each cache line's metadata includes a "timestamp" value. When a load-mark is placed on a cache line, the current value of a timestamp is written into the metadata. At predetermined times (e.g., when a transaction that is using the timestamp completes), the timestamp is incremented, thereby rendering all load-marks that include the old timestamp stale.

In order to determine if a thread can acquire exclusive access to the cache line, the system determines if there is a load-marked copy of the cache line in a local cache that includes the current timestamp. If so, the system denies the request for exclusive access. The process of using timestamps to load-mark cache lines is described in more detail in U.S. patent application Ser. No. 11/773,158, entitled "Cache Line Marking with Shared Timestamps," filed 3 Jul. 2007 by inventors Robert E. Cypher and Shailender Chaudhry, which issued 13 Apr. 2010 as U.S. Pat. No. 7,698,504, which is hereby incorporated by reference.

Cache Control System

Figure 2:
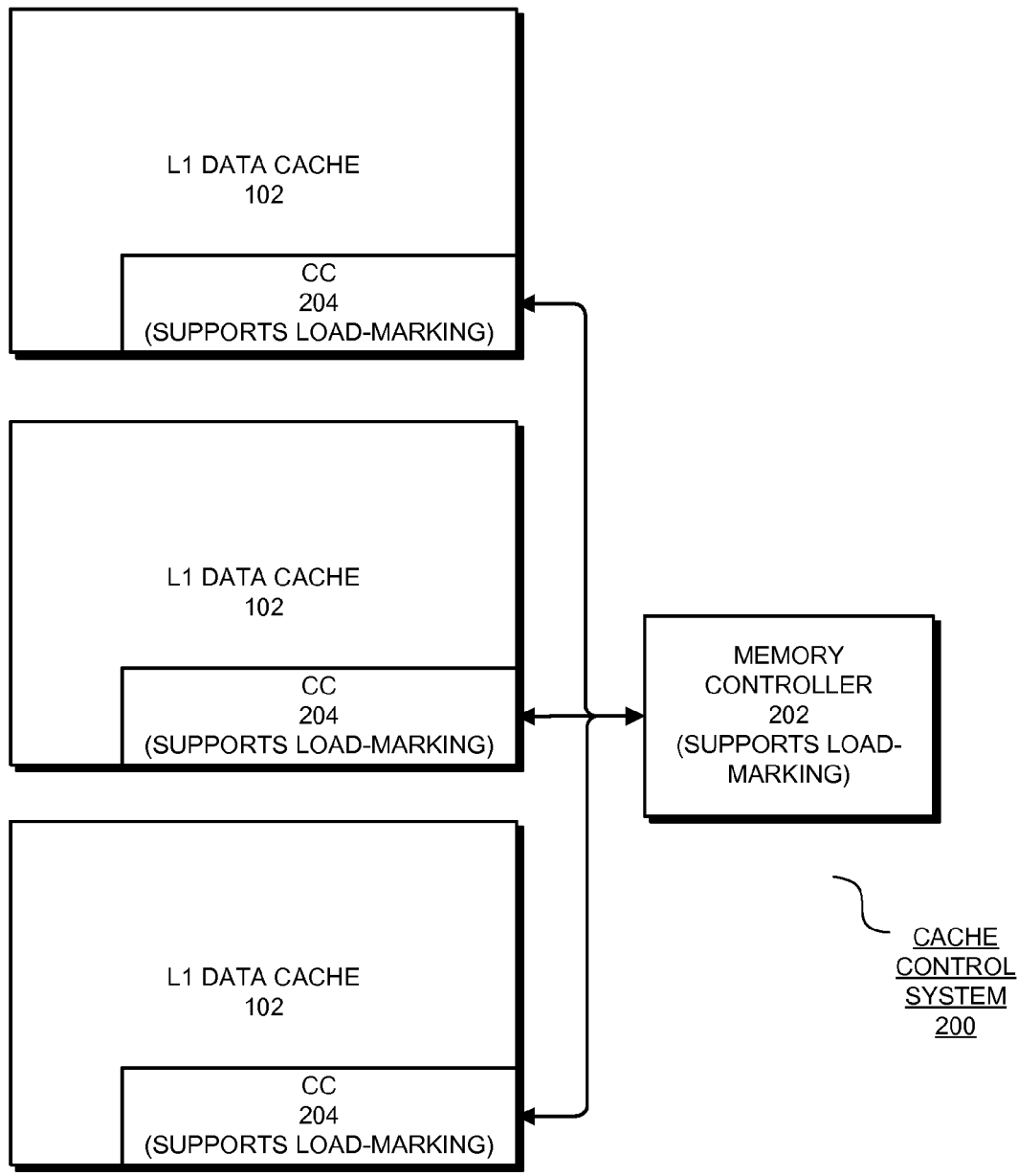
FIG. 2 presents a simplified cache control system in accordance with embodiments of the present invention.

FIG. 2 presents a simplified cache control system 200 in accordance with embodiments of the present invention. Cache control system 200 includes a set of cache controllers 204 (CC 204) and a memory controller 202. Cache control system 200 maintains coherency information for a memory hierarchy that includes one or more caches (e.g., L1 data caches 102 and L2 cache 104) that share cache lines. Generally, a CC 204 is associated with a cache (e.g., L1 data cache 102) and is responsible for controlling the operation of the associated cache. For example, a CC 204 can record the coherency state of the cache lines in an L1 data cache 102 and/or request read or write permission for cache lines from memory controller 202. On the other hand, memory controller 202 controls memory accesses between the caches.

In embodiments of the present invention, CCs 204 and memory controller 202 support load-marking cache lines (as indicated in FIG. 2).

Note that for the purpose of illustration, we describe cache controllers 204 that are located in L1 data caches 102. However, in alternative embodiments, some or all of cache controllers 204 are located elsewhere and/or control one or more associated caches.

Coherency Protocols

In some embodiments of the present invention, cache control system 200 uses a directory-based coherency protocol. In these embodiments, memory controller 202 includes a directory that includes a record of each cache line held in a set of L1 data caches 102. The directory also includes a record of the coherency status for each of these cache lines. For example, memory controller 202 can have a coherency status of modified, owned, exclusive, shared, or invalid (i.e., in a MOESI-based system) for each cache line.

In these embodiments, when requesting read or write permission for a cache line, a CC 204 sends a request to memory controller 202. Memory controller 202 consults the directory to determine which L1 data caches 102 hold a copy of the cache line and in which protocol state the cache lines are held. Memory controller 202 may then send a request for the cache line to the CC 204 associated with the affected L1 data caches 102. For example, if a cache line is in the "shared" state in two L1 data caches 102 and another CC 204 requests a writeable copy of the cache line, memory controller 202 sends an invalidate request for the cache line to the CC 204 associated with the two L1 data caches 102. On the other hand, if a cache line is held in the modified state in an L1 data cache and another CC 204 requests a readable copy of the cache line, memory controller 202 sends a request to the CC 204 associated with the L1 data cache 102 to convert the cache line to the shared state (which causes the CC 204 to return the modified data to memory controller 202). Memory controller 202 then forwards the modified data to the requesting CC 204.

In some embodiments of the present invention, CCs 204 can respond back to the requesting memory controller 202 by either acknowledging (i.e., granting) or denying the request.

Note that although some embodiments include a directory in memory controller 202, in alternative embodiments L1 data caches 102 or other structures in cache control system 200 (not shown) include some or all of the directory. In these embodiments, the determination of whether a cache line is present in a cache and what the protocol status of the cache line is involves communicating with the controller associated with the appropriate directory.

In some embodiments of the present system, cache control system 200 uses a snooping coherency protocol. In these embodiments, each CC 204 is coupled to a bus that includes a number of global signal lines that are used to make requests for read or write permission for cache lines from memory controller 202. CCs 204 monitor the bus to determine when a request for write permission on a cache line affects a cache line for which the corresponding L1 data cache 102 has a local copy. When such a request is detected, the CC 204 can respond by asserting one or more global signal lines to deny the request. The requesting CC 204 monitors the global signal lines to determine if another cache has denied the request.

Modified Cache-Coherency Protocol

Embodiments of the present invention provide a modified version of the directory-based or snooping cache protocols that enables a CC 204 (see FIG. 2) to avoid invalidating a load-marked cache line. The following sections describe the modifications to these protocols.

Directory-Based Coherency Protocol

For a directory-based cache-coherency protocol, embodiments of the present invention add explicit negative acknowledgments (NACKs) to the standard cache-coherency protocol. In these embodiments, when a thread issues a request to obtain exclusive access to a cache line L, the corresponding CC 204 sends a request to obtain exclusive access to memory controller 202. Memory controller 202 determines which L1 data caches contain a copy of the cache line (and the protocol states for the copies of those cache lines). Memory controller 202 then signals the affected L1 data caches 102 to invalidate the local copy of the cache line (and possibly to return a copy of cache line data, if the local copy of the cache line has been modified). If an L1 data cache 102 contains a copy of L which does not have a current load-mark, the CC 204 for the L1 data cache 102 invalidates the cache line and sends a signal acknowledging the invalidation to memory controller 202. However, if an L1 data cache 102 contains a copy of L which includes a current load-mark, the CC 204 for the L1 data cache 102 retains the copy in the same coherency protocol state (e.g. M, O, E, or S) and sends a NACK signal to memory controller 202. If any CC 204 NACKs an invalidation, a NACK is sent from the memory controller 202 to the original requesting CC 204 (and from that CC 204 to the requesting thread) to indicate that the attempt to obtain exclusive access to L has failed.

Snooping Protocol

For a snooping coherency protocol, embodiments of the present invention indicate NACKs on global cache-control lines (i.e., globally-ORed output lines such as "shared," "unmapped," or "owned"). In these embodiments, when a thread issues a request to obtain exclusive access to a cache line L, the CC 204 for the corresponding L1 data cache 102 sends a request to memory controller 202 for exclusive access to the cache line using a set of global signal lines. Each of the other CCs 204 in the system monitors (i.e., snoops) the global signal lines. If a CC 204 for a cache that includes a local copy of L detects a request for exclusive access to L, the CC 204 determines if the local copy of L includes a current load-mark. If so, the CC 204 keeps the copy in the same coherency protocol state (e.g. M, O, E, or S) and denies (negatively acknowledges) the invalidation by asserting a predetermined signal on the global cache-control lines. If any CC 204 denies the invalidation request, a denial is sent from the memory controller 202 to the original requesting CC 204 (and from that CC 204 to the requesting thread) to indicate that the attempt to obtain exclusive access to L has failed.

Some embodiments of the present invention include a separate global cache control line (or lines) for conveying the denial signal. For example, an additional "NACK" line can be included as a coherence signal. Alternative embodiments assert an otherwise unused combination of the existing lines to indicate the denial. For example, an "unmapped" global cache control line can be asserted at the same time as an "owned" global cache control line to indicate the denial.

Load-Mark Maintenance Process

Figure 3:
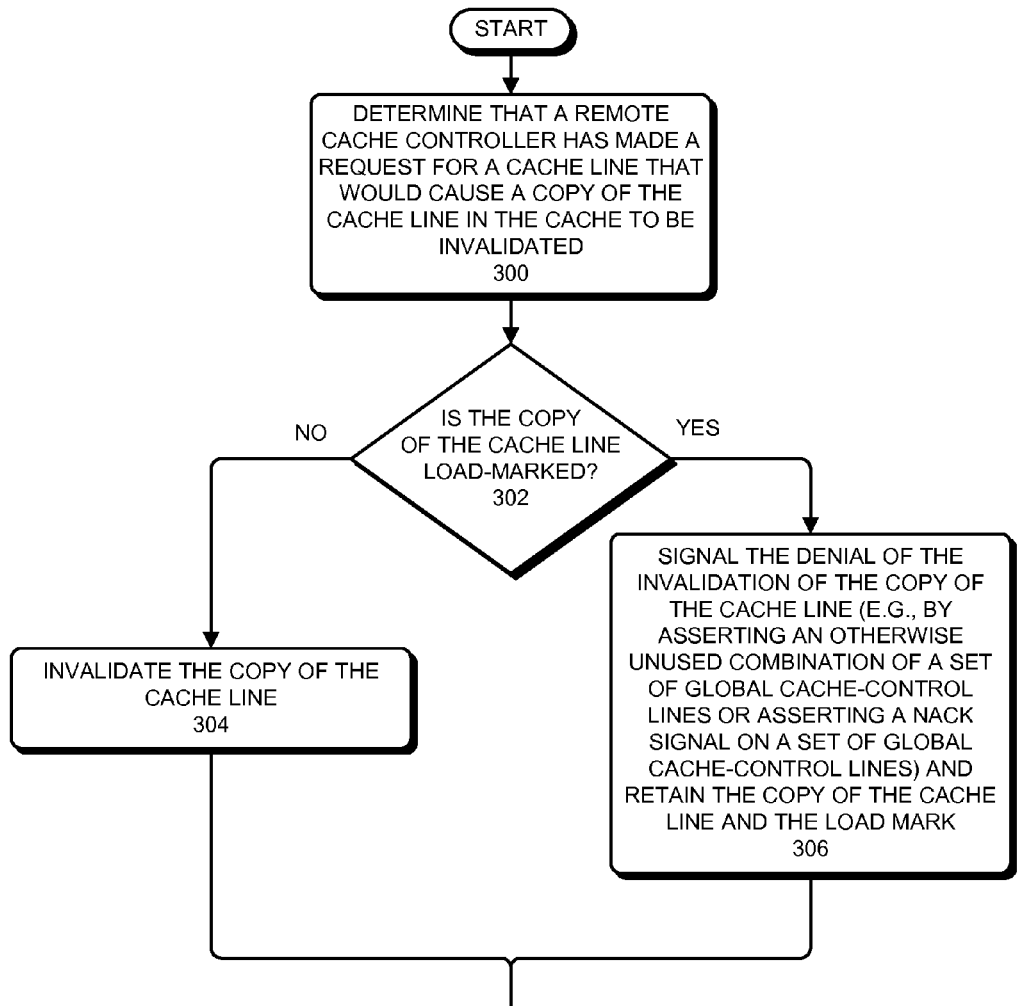
FIG. 3 presents a flowchart illustrating the process of maintaining a load-mark on a cache line in accordance with embodiments of the present invention.

FIG. 3 presents a flowchart illustrating the process of maintaining a load-mark on a cache line in accordance with embodiments of the present invention.

The process starts when a CC 204 determines that a remote cache controller has made a request for a cache line that would cause a local copy of the cache line in the cache to be invalidated (step 300). For example, a CC 204 in a directory-based protocol can receive a signal from memory controller 202 indicating that another CC 204 has requested exclusive access to the cache line (and hence the local copy of the cache line should be invalidated). Alternatively, a CC 204 in a snooping protocol can determine that another CC 204 has requested exclusive access to the cache line from memory controller 202.

The CC 204 then determines if the copy of the cache line is load-marked (step 302). For example, the CC 204 can determine if the cache line includes a reader-count value that is greater than zero. Alternatively, the CC 204 can determine if the cache line includes a load-mark with a current timestamp.

If the copy of the cache line is not load-marked, the CC 204 invalidates the copy of the cache line (step 304). In some embodiments, the system responds with an acknowledge signal to memory controller 202 when the cache line has been invalidated.

Otherwise, if the copy of the cache line is load-marked, the CC 204 signals the denial of the invalidation of the copy of the cache line and retains the copy of the cache line (step 306). For example, in a directory-based protocol the CC 204 can send a NACK signal to the memory controller 202. In a snooping protocol, the CC 204 can assert an otherwise unused combination (e.g., "unmapped" and "owned" signal) on a set of global cache-control lines that are monitored to indicate the denial. On the other hand, in a snooping protocol, the CC 204 can assert a special NACK signal on a set of global cache-control lines that to indicate the denial.

Alternative Embodiments

Store Starvation

Because one or more load-marking threads can place load-marks on a cache line L in such a way that a load-mark is continually present on the cache line, a thread awaiting exclusive access to the cache line (e.g., to complete a store) can be repeatedly denied access to the cache line. Some embodiments of the present invention prevent this "starvation" of stores by asserting an indicator in the metadata for L to indicate that no new load-marks can be placed on L. Specifically, when a CC 204 NACKs a request for exclusive access to L because L has a current timestamp, the CC 204 modifies metadata on L to indicate that no new load-marks can be placed on L. In addition, the CC 204 places the metadata on the copy of L in L1 cache 102. Furthermore, when a CC 204 NACKs a request for exclusive access to L, the memory controller 202 may modify the metadata on its copy of L to indicate that no new load-marks can be placed on it. Then, whenever any additional copies of L are made, the metadata is included, which prevents additional load-marks from being placed on L. As a result, no new load-marks can be placed on L and the requesting thread can get exclusive access when the current load-marks are removed from L at which point the metadata preventing new load-marks from being placed on L can be cleared.

Non-NACKable Requests

In some embodiments of the present invention, a request for exclusive access to the cache line includes an indication about whether or not the request is NACKable. In these embodiments, a "NACKable" request is used if the requesting CC 204 does not have a load-mark on the line, or has a load-mark with a reader-count of 1 in the corresponding cache. This can prevent the requestor's own load-mark from causing NACKs.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus that maintains load-marks on cache lines, comprising:
    a cache that accommodates a set of cache lines, wherein each cache line includes metadata for load-marking the cache line;
    a local cache controller for the cache;
    wherein upon determining that a remote cache controller has made a request for a cache line that would cause the local cache controller to invalidate a copy of the cache line in the cache, the local cache controller determines if there is a load-mark in the metadata for the copy of the cache line;
    if not, the local cache controller invalidates the copy of the cache line;
    otherwise, the local cache controller sends a signal to the remote cache controller to indicate a denial of the invalidation of the cache line and retains the copy of the cache line and the load-mark in the metadata for the copy of the cache line;
    wherein the load-mark is placed for a thread to indicate that no other threads can store to the cache line.

2. The apparatus of claim 1, wherein determining that the remote cache controller has made a request for a cache line involves determining that the remote cache controller has asserted a combination of global cache-control lines to request exclusive access to the cache line; and
    wherein denying the invalidation request involves asserting an otherwise unused combination of a set of global cache-control lines to indicate the denial.

3. The apparatus of claim 1, wherein determining that the remote cache controller has made a request for a cache line involves determining that the remote cache controller has asserted a combination of global cache-control lines to request exclusive access to the cache line; and
    wherein denying the invalidation request involves asserting a negative acknowledge (NACK) signal on a set of global cache-control lines to indicate the denial.

4. The apparatus of claim 1, wherein determining that the remote cache controller has made a request for a cache line involves determining that a memory controller has forwarded the request from the remote cache controller to the local cache controller; and
    wherein denying the invalidation request involves signaling a NACK to the memory controller to indicate the denial.

5. The apparatus of claim 1, wherein when denying the invalidation of the load-marked cache line, the local cache controller asserts an indicator in the metadata for the copy of the cache line to prevent subsequent load-marks from being placed on the copy of the cache line.

6. The apparatus of claim 5, wherein the local cache controller subsequently deasserts the indicator in the metadata for the copy of the cache line after exclusive access to the cache line has been granted.

7. The apparatus of claim 1, wherein when determining if there is a load-mark in the metadata for the copy of the cache line, the local cache controller determines if a reader count is greater than zero in the metadata for the copy of the cache line.

8. The apparatus of claim 1, wherein when determining if there is a load-mark in the metadata, the local cache controller determines if there exists a load-mark and a current timestamp in the metadata for the copy of the cache line.

9. The apparatus of claim 1, wherein upon determining that the remote cache controller has made a non-NACKable request, the local cache controller invalidates the copy of the cache line.

10. The apparatus of claim 9, wherein invalidating the copy of the cache line involves acknowledging the invalidation of the copy of the cache line.

11. A method for maintaining load-marks on a set of cache lines in a cache, comprising:
    determining that a remote cache controller has made a request for a cache line that would cause a copy of the cache line in the cache to be invalidated;
    determining if the copy of the cache line in the cache is load-marked;
    if not, invalidating the copy of the cache line;
    otherwise, sending a signal from the local cache controller to the remote cache controller to indicate a denial of the invalidation of the copy of the cache line and retaining the copy of the cache line and the load-mark in the metadata for the copy of the cache line;
    wherein the load-mark is placed for a thread to indicate that no other threads can store to the cache line.

12. The method of claim 11, wherein determining that the remote cache controller has made a request for a cache line involves determining that the remote cache controller has asserted a combination of global cache-control lines to request exclusive access to the cache line; and
    wherein denying the invalidation request involves asserting an otherwise unused combination of a set of global cache-control lines to indicate the denial.

13. The method of claim 11, wherein determining that the remote cache controller has made a request for a cache line involves determining that the remote cache controller has asserted a combination of global cache-control lines to request exclusive access to the cache line; and
    wherein denying the invalidation request involves asserting a NACK signal on a set of global cache-control lines to indicate the denial.

14. The method of claim 11, wherein determining that the remote cache controller has made a request for a cache line involves determining that a memory controller has forwarded the request from the remote cache controller to the local cache controller; and
    wherein denying the invalidation request involves signaling a NACK to the memory controller to indicate the denial.

15. The method of claim 11, wherein denying the invalidation of a cache line involves asserting an indicator in the metadata for the cache line to prevent subsequent load-marks from being placed on the cache line.

16. The method of claim 15, wherein the method further comprises subsequently deasserting the indicator after exclusive access to the cache line has been granted.

17. The method of claim 11, wherein determining if there is a load-mark in the metadata for the copy of the cache line involves determining if a reader count is greater than zero in the metadata for the copy of the cache line.

18. The method of claim 11, wherein determining if there is a load-mark in the metadata involves determining if there exists a current timestamp in the metadata for the copy of the cache line.

19. The method of claim 11, wherein upon determining that the remote cache controller has made a non-NACKable request that would cause the invalidation of the copy of the cache line, the method further comprises invalidating the copy of the cache line.

20. The method of claim 19, wherein invalidating the copy of the cache line involves acknowledging the invalidation of the copy of the cache line.

21. A computer system for maintaining load-marks on cache lines, comprising:
   a processor;
   a cache that accommodates a set of cache lines coupled to the processor, wherein each cache line includes metadata for load-marking the cache line, and wherein the cache stores data for the processor;
   a local cache controller for the cache;
   wherein upon determining that a remote cache controller has made a request for a cache line that would cause the local cache controller to invalidate a copy of the cache line in the cache, the local cache controller determines if there is a load-mark in the metadata for the copy of the cache line;
   if not, the local cache controller invalidates the copy of the cache line;
   otherwise, the local cache controller sends a signal to the remote cache controller to indicate a denial of the invalidation of the cache line and retains the copy of the cache line and the load-mark in the metadata for the copy of the cache line;
   wherein the load-mark is placed for a thread to indicate that no other threads can store to the cache line.

22. The computer system of claim 21, wherein determining that the remote cache controller has made a request for a cache line involves determining that the remote cache controller has asserted a combination of global cache-control lines to request exclusive access to the cache line; and
   wherein denying the invalidation request involves asserting an otherwise unused combination of a set of global cache-control lines to indicate the denial.

23. The computer system of claim 21, wherein determining that the remote cache controller has made a request for a cache line involves determining that the remote cache controller has asserted a combination of global cache-control lines to request exclusive access to the cache line; and
   wherein denying the invalidation request involves asserting a NACK signal on a set of global cache-control lines to indicate the denial.

24. The computer system of claim 21, wherein determining that the remote cache controller has made a request for a cache line involves determining that a memory controller has forwarded the request from the remote cache controller to the local cache controller; and
   wherein denying the invalidation request involves signaling a NACK to the memory controller to indicate the denial.

* * * * *